(12) United States Patent
Reid

(10) Patent No.: US 9,138,829 B2
(45) Date of Patent: Sep. 22, 2015

(54) PIPE WELDING FIXTURE

(71) Applicant: Robert David Reid, Red Deer (CA)

(72) Inventor: Robert David Reid, Red Deer (CA)

(*) Notice: Subject to any disclaimer, the term of this patent is extended or adjusted under 35 U.S.C. 154(b) by 121 days.

(21) Appl. No.: 14/016,261

(22) Filed: Sep. 3, 2013

(65) Prior Publication Data
US 2015/0060528 A1  Mar. 5, 2015

(51) Int. Cl.
   B23K 37/04    (2006.01)
   B23K 31/02    (2006.01)
   B23K 37/053   (2006.01)

(52) U.S. Cl.
   CPC ............ B23K 31/02 (2013.01); B23K 37/0435 (2013.01); B23K 37/0452 (2013.01); B23K 37/0533 (2013.01); B23K 2201/06 (2013.01); B23K 2201/10 (2013.01)

(58) Field of Classification Search
   None
   See application file for complete search history.

(56) References Cited

U.S. PATENT DOCUMENTS

| | | | |
|---|---|---|---|
| 3,081,123 A | 3/1963 | Steed | |
| 3,239,209 A * | 3/1966 | Kucka | 269/55 |
| 3,245,201 A * | 4/1966 | Richardson | 33/379 |
| 3,394,389 A * | 7/1968 | Giora Amir | 269/84 |
| 3,670,418 A | 6/1972 | Hamilton, Jr. | |
| 3,732,614 A * | 5/1973 | Boutell | 228/150 |
| 3,772,753 A * | 11/1973 | Sargeant | 29/721 |
| 3,776,539 A * | 12/1973 | Curtis et al. | 269/81 |
| 3,827,126 A * | 8/1974 | Shiozawa et al. | 29/721 |
| 3,898,714 A | 8/1975 | McFadden | |
| 3,944,202 A * | 3/1976 | Dearman | 269/130 |
| 4,378,937 A * | 4/1983 | Dearman | 269/6 |
| 4,483,059 A | 11/1984 | Dearman | |
| 4,524,959 A * | 6/1985 | Kubo | 269/43 |
| 4,570,842 A * | 2/1986 | Gregorious et al. | 228/48 |
| 5,040,716 A | 8/1991 | Stetz | |
| 5,312,096 A * | 5/1994 | Jasper | 269/43 |
| 6,108,391 A | 8/2000 | Deaver et al. | |
| 6,283,361 B1 * | 9/2001 | Maki et al. | 228/212 |
| 6,349,869 B1 | 2/2002 | McBee | |
| 7,178,252 B1 * | 2/2007 | Belgard | 33/412 |
| 7,617,963 B1 | 11/2009 | Jensen | |
| 7,942,307 B2 * | 5/2011 | Greenwall | 228/17.7 |
| 2003/0160086 A1 * | 8/2003 | Cecil et al. | 228/170 |
| 2005/0200146 A1 | 9/2005 | Mieger et al. | |
| 2007/0241250 A1 * | 10/2007 | Wong | 248/226.11 |
| 2007/0256288 A1 | 11/2007 | Vermaat | |
| 2013/0299563 A1 * | 11/2013 | Uecker | 228/213 |

FOREIGN PATENT DOCUMENTS

| | | | | |
|---|---|---|---|---|
| GB | 1465959 A | * | 3/1977 | |
| JP | 55133888 A | * | 10/1980 | B23K 20/00 |
| JP | 58199695 A | * | 11/1983 | B23K 37/04 |
| JP | 58199696 A | * | 11/1983 | B23K 37/04 |
| JP | 01-273672 | | 1/1989 | |

* cited by examiner

*Primary Examiner* — Kiley Stoner
(74) *Attorney, Agent, or Firm* — Ray Meiers; Endurance Law Group

(57) ABSTRACT

A pipe welding fixture is disclosed herein. The pipe welding fixture includes a body portion. The pipe welding fixture also includes a first support segment fixedly engaged with the body portion and defining a first support surface extending in a first arc in a first plane. The pipe welding fixture also includes a second support segment fixedly engaged with the body portion and defining a second support surface extending in a second arc in a second plane. The first plane and the second plane are transverse with respect to one another.

14 Claims, 3 Drawing Sheets

PIPE WELDING FIXTURE

BACKGROUND OF THE INVENTION

1. Field of the Invention

The invention relates to a fixture that can be utilized to support a pipe during a welding operation on the pipe.

2. Description of Related Prior Art

U.S. Pat. No. 5,312,096 discloses a WELDING JIG FOR PIPES. The '096 patent discloses a welding jig having a first support plate and a second support plate rotatably connected to the first support plate. The second support plate has a template-shaped perimeter including arcuately shaped segments shaped to support pipe fittings of different sizes. By selectively positioning a particular segment and securing locking the particular segment in place, a particular pipe fitting such as a particular 90° pipe elbow can be supported with one end resting on the selected particular segment and the other end resting on the first support plate. By this arrangement, particular pipe fitting can be supported in a predetermined and square position relative to a pipe, thus facilitating welding the particular pipe elbow to the pipe. This allows substantially a one-person welding operation.

SUMMARY OF THE INVENTION

In summary, the invention is a pipe welding fixture. The pipe welding fixture includes a body portion. The pipe welding fixture also includes a first support segment fixedly engaged with the body portion and defining a first support surface extending along a first arc in a first plane. The pipe welding fixture also includes a second support segment fixedly engaged with the body portion and defining a second support surface extending along a second arc in a second plane. The first plane and the second plane are transverse with respect to one another.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

Figure 1:
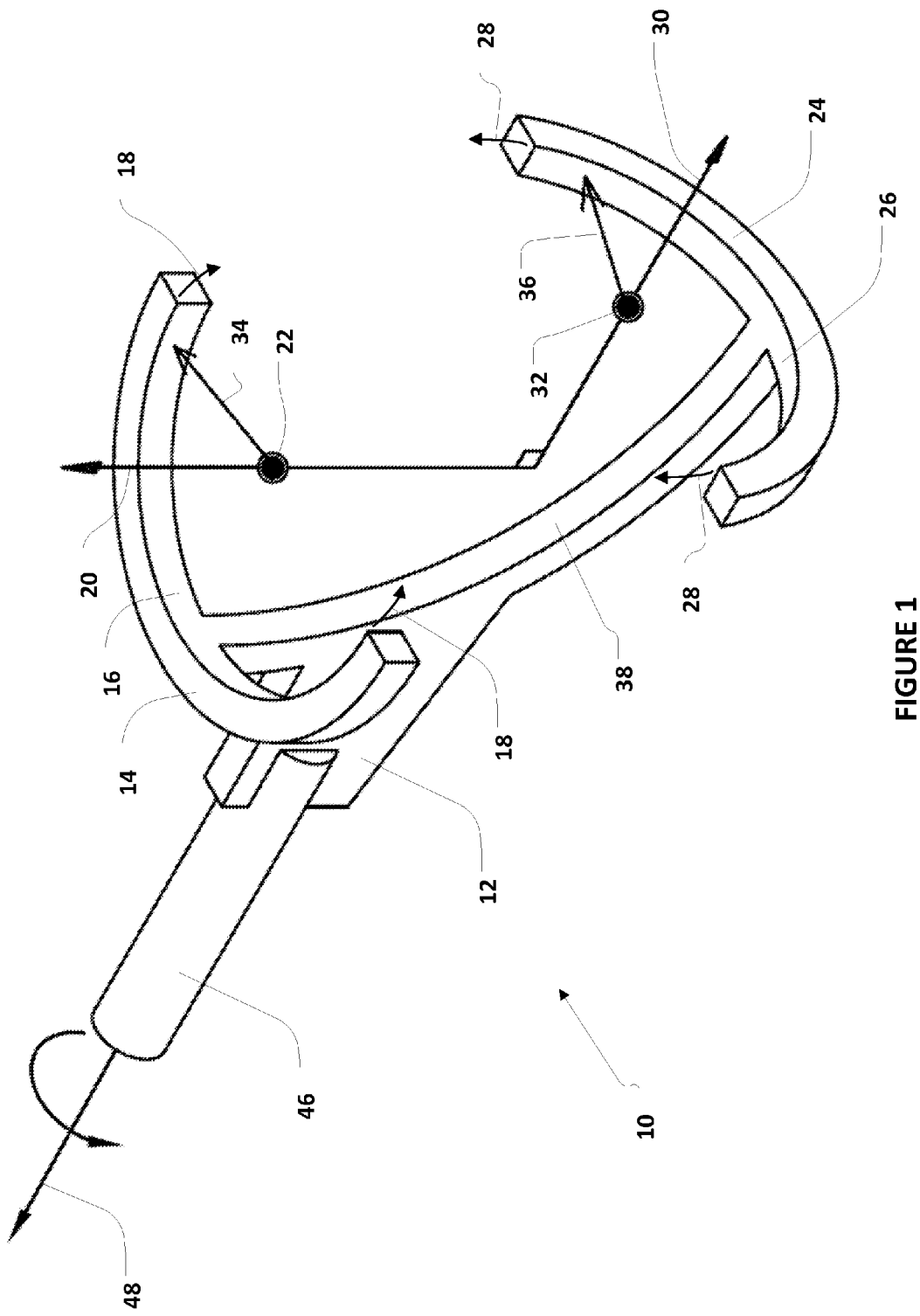
FIG. 1 is a first perspective view of an exemplary embodiment of the broader invention.

The invention, as demonstrated by the exemplary embodiment described below, provides a fixture for supporting a section of pipe or tubing during a welding operation. In the exemplary embodiment of the broader invention, a ninety degree elbow can be held during roll welding to another section of pipe, such as a straight section or another curved section. The fixture allows a welder to be able to position two pieces together in a flat or flush orientation with respect to each other.

An exemplary embodiment of the broader invention is shown in the Figures as a pipe welding fixture 10. The pipe welding fixture 10 includes a body portion 12. The pipe welding fixture 10 also includes a first support segment 14 fixedly engaged with the body portion 12. The first support segment defines a first support surface 16 extending along a first arc 18. The first arc is visible in a first plane. In the exemplary embodiment, a "first" plane can be any plane that intersects the first support surface 16 and is normal to the illustrated axis 20. The first plane can be normal to the first support surface 16. The exemplary first arc 18 is centered on a point referenced at 22.

The pipe welding fixture 10 also includes a second support segment 24 fixedly engaged with the body portion 12. The second support segment 24 defines a second support surface 26 extending along a second arc 28 in a second plane. In the exemplary embodiment, a "second" plane can be any plane that intersects the second support surface 26 and is normal to the illustrated axis 30. The second plane can be normal to the second support surface 26. The exemplary second arc 28 is centered on a point referenced at 32.

The first plane and the second plane are transverse with respect to one another. In the exemplary embodiment, the first plane and the second plane are perpendicular to one another. In other embodiments of the broader invention, the first plane and the second plane can arranged at an angle with respect to one another that is less than ninety degrees.

The exemplary body portion 12 can be formed from steel. In other embodiments of the broader invention, a body portion can be formed from any material having sufficient strength in view of the expected operating environment. For example, if relatively larger and/or heavier pipe sections are to be supported, a body portion can be formed from a stronger material such as steel. If relatively lighter and/or smaller pipe sections are to be supported, a body portion can be formed from a material having less strength than steel (by weight), such as aluminum. Body portions can be formed other metals such as cast iron, or from non-metallic materials if desired and if feasible in view of the expected operating environment.

In the exemplary embodiment, the first arc 18 and the second arc 28 have a common radius with respect to length. The radius of the first arc 18 is referenced at 34 and the radius of the second arc 28 is referenced at 36. The first support segment 14 extends 180° along the first arc 18, about the center point 22. The second support segment 24 extends less than 180° along the second arc 28. In various embodiments of the broader invention, the radial or arcuate length of the support segments can be the same or different.

The exemplary pipe welding fixture 10 also includes a third support surface 38 defined by the body portion 12. The third support surface 38 extends at least partially in a third arc 40 in a third plane. The exemplary third plane is transverse to the first plane and to the second plane. In the exemplary embodiment, the third plane contains the axes 22 and 30 and is normal to the third support surface 38. The first plane and the second plane and the third plane are thus perpendicular to one another in the exemplary embodiment. The exemplary third arc 40 is centered on a point referenced at 42 and has a radius referenced at 44. In embodiments of the broader invention, the point 42 can be coincident with the point 32, the point 22, neither point 22 nor point 32, or both point 22 and point 32.

Figure 3:
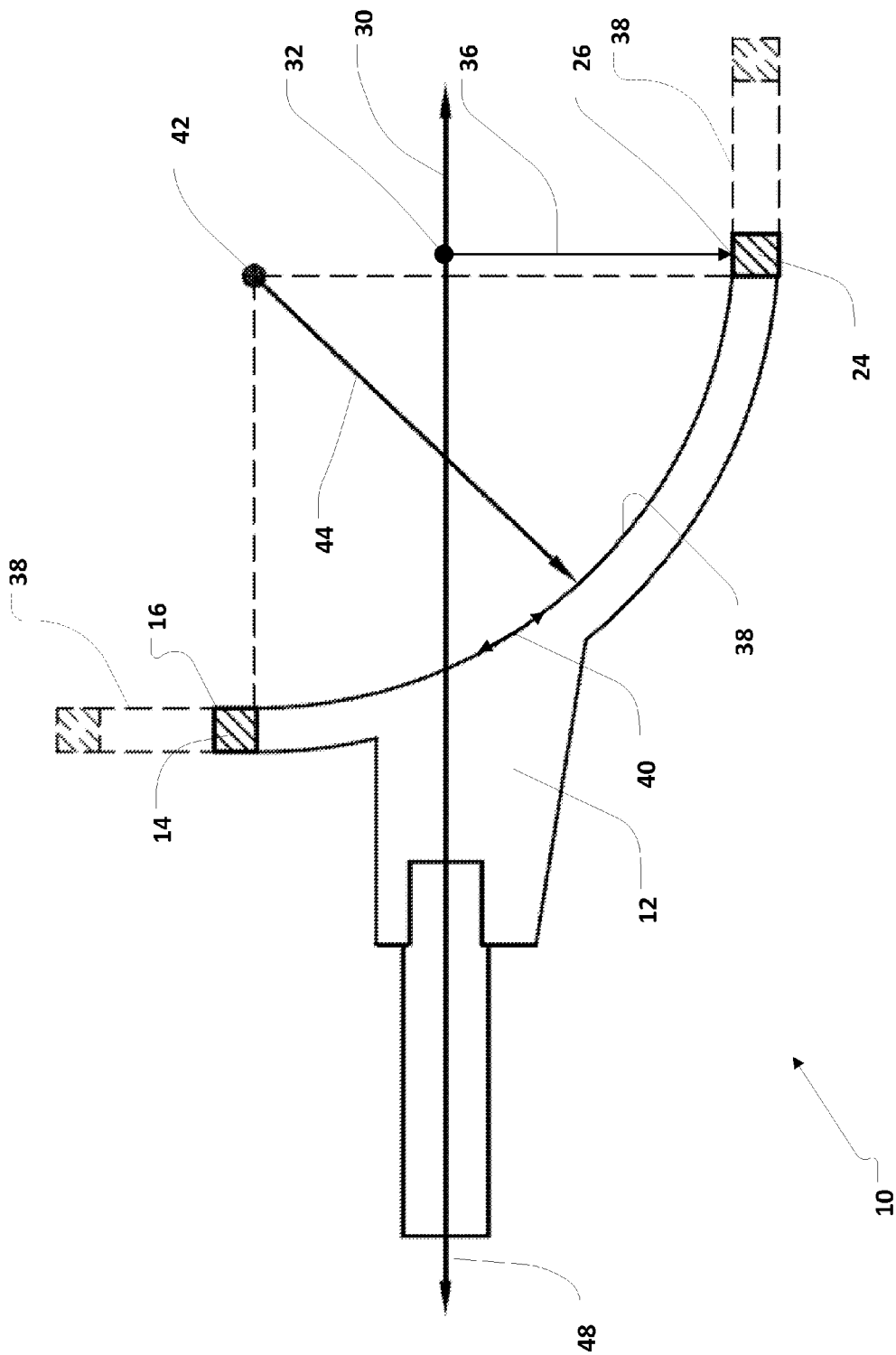
FIG. 3 is a partial cross-sectional view taken along broken section line 3-3 in FIG. 2, showing cross-sections of first and second support segments of the exemplary embodiment of the broader invention.

The third support surface 38 and the third arc 40 are continuous between the first support surface 16 and the second support surface 26. In alternative embodiments, the third support surface 38 can be discontinuous relative to the third arc 40. In other words, the third support surface 38 need not follow the third arc 40 fully, between the first support surface 16 and the second support surface 26. Also, the third support surface 38 can extend beyond the third arc 40. FIG. 3 shows such an embodiment of the broader invention in phantom wherein the support surface extends past the third arc 40 and includes straight portions.

The exemplary pipe welding fixture 10 can also include a shaft 46 projecting from the body portion 12. The shaft 46 can project from a side of the body portion 12 opposite the third support surface 38, the first support segment 14 and the second support segment 24. A central axis 48 of the shaft 46 projects through the center 32 of the second arc 28. Thus, the axes 30 and 48 are collinear in the exemplary embodiment of the invention. The shaft 46 can have a circular outer profile. Alternatively, the shaft 46 can have an outer profile that is hexagonal, octagonal, rhomboid, or some other polygon to allow the shaft 46 to be positively engaged with a chuck for rotation.

In some embodiments of the invention, the body portion 12, the first support segment 14, the second support segment 24, and the shaft 46 can be integrally-formed. For example, the pipe welding fixture 10 can be a casting. "Integrally-formed" refers to the fact that in the exemplary embodiment the body portion 12, the first support segment 14, the second support segment 24, and the shaft 46 can be formed together rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined. In other embodiments, the various components can be separately formed and fixed together such as through welding.

Figure 2:
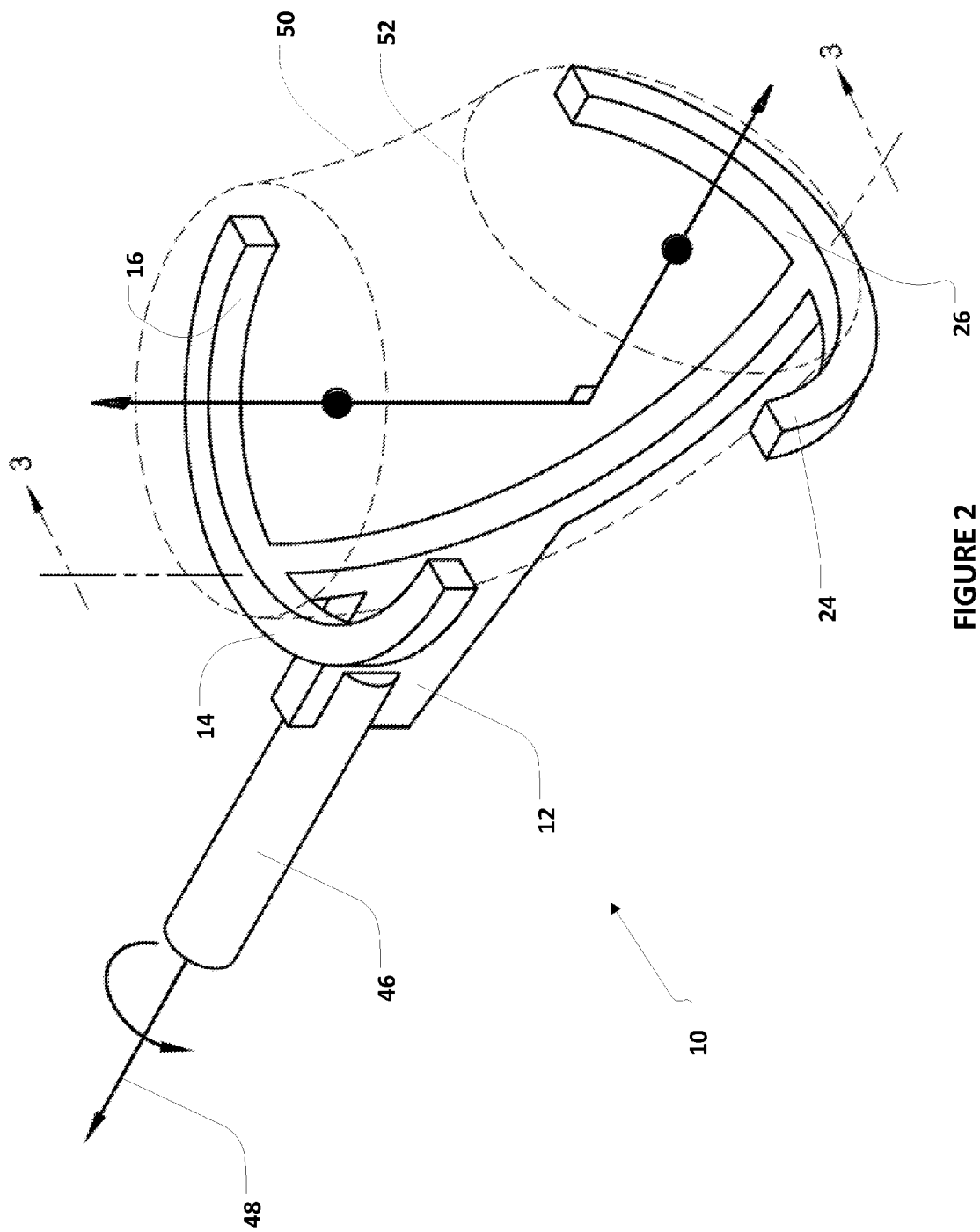
FIG. 2 is a second perspective view of an exemplary embodiment of the invention, showing a pipe elbow in phantom.

In an operation of welding a pipe section, the pipe section can be releasably and rigidly mounted in the pipe welding fixture 10. In FIG. 2, a curved pipe section 50 is shown in phantom, resting on the surfaces 16, 26 and 38. The pipe section 50 can be releasably and rigidly mounted in the pipe welding fixture 10 by a locking chain clamp, such as the clamps manufactured by Irwin Tools. See http://www.irwin-.com/tools/locking-tools/the-original-locking-chain-clamp. The chain can be wrapped around the pipe section 50 and the body portion 12 and then locked to hold the pipe section 50 rigidly in place.

After the pipe section 50 is releasably and rigidly mounted in the pipe welding fixture 10, one end of the pipe section 50, such as the end referenced at 52, can be welded to a second pipe section. The second pipe section can be another curved pipe section or a straight section of pipe. After an initial portion of the end 52 has been welded to the second pipe section, the body portion 12 can be rotated, the remaining portion of the perimeter of the end 52 being welded to the other pipe section during rotation. The rotation can be continuous or intermittent.

The body portion 12 can be rotated about the axes 30, 48. The axes 30, 48 project through the center 32 of the second arc 28 during the welding step. The center of the end 52 can thus be the center of rotation. The plane defined by the end 52 can be normal to the axis of rotation. The body portion 12 can be mounted in a chuck prior to the rotating step and rotated by a source of rotational power such as motor or engine. The shaft 46 can be the structure mounted in the chuck.

The broader invention can be practiced in numerous, different embodiments, including the specific embodiment described about. In one embodiment, the invention can be practiced in a kit. The kit can include a plurality of pipe welding fixtures. Each of the pipe welding fixtures of the kit can include a body portion, a first support segment, and a second support segment. Each of the pipe welding fixtures of the kit can include a shaft projecting from the respective body portion. The pipe welding fixtures of the kit can be differentiated from one another by size. Each pipe welding fixture of the kit can be sized to accommodate a particular size of pipe. The respective first arcs of the pipe welding fixtures can have different radii. The shafts of the pipe welding fixtures can be the same or different. The central axis of the respective shafts can be oriented to project through a center of the radius of the respective second arc of the second support segments. A chain locking clamp can be included in the kit as well.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A pipe welding fixture comprising:
   a body portion;
   a first support segment fixedly engaged with said body portion and defining a first support surface extending along a first arc in a first plane;
   a second support segment fixedly engaged with said body portion and defining a second support surface extending along a second arc in a second plane, wherein said first plane and said second plane are transverse with respect to one another;
   a third support surface defined by said body portion and extending at least partially in a third arc in a third plane, wherein said third plane is transverse to said first plane and to said second plane; and
   a shaft projecting from a side of said body portion opposite said third support surface, said first support segment and said second support segment.

2. The pipe welding fixture of claim 1 wherein said first plane and said second plane are perpendicular to one another.

3. The pipe welding fixture of claim 1 wherein said first plane and said second plane and said third plane are perpendicular to one another.

4. The pipe welding fixture of claim 1 wherein said third support surface and said third arc are continuous between said first support surface and said second support surface.

5. The pipe welding fixture of claim 1 wherein said third support surface is continuous between said first support surface and said second support surface and extends beyond said third arc.

6. The pipe welding fixture of claim 1 wherein said first arc and said second arc have a common radius.

7. The pipe welding fixture of claim 1 wherein said first support segment extends 180° along said first arc.

8. The pipe welding fixture of claim 1 wherein said second support segment extends less than 180° along said second arc.

9. A kit comprising:
a plurality of pipe welding fixtures each according to claim 1, including a first pipe welding fixture and a second pipe welding fixture, wherein the respective first arcs of said first pipe welding fixture and said second pipe welding fixture have different radii.

10. The kit of claim 9 wherein each of said plurality of pipe welding fixtures further comprises:
a shaft projecting from the respective body portion, wherein a central axis of the respective shaft projects through a center of the radius of the respective second arc.

11. The kit of claim 9 wherein the respective shafts are sized to have a common diameter.

12. A pipe welding fixture comprising:
a body portion;
a first support segment fixedly engaged with said body portion and defining a first support surface extending along a first arc in a first plane;
a second support segment fixedly engaged with said body portion and defining a second support surface extending along a second arc in a second plane, wherein said first plane and said second plane are transverse with respect to one another;
a shaft projecting from a side of said body portion opposite said first support segment and said second support segment, wherein said first support surface and said second support surface are spaced ninety degrees from one another and wherein a central axis of said shaft projects through a center of said second arc.

13. The pipe welding fixture of claim 12 wherein said shaft has a circular outer profile.

14. The pipe welding fixture of claim 12 wherein said body portion, said first support segment, said second support segment, and said shaft are integrally-formed.

\* \* \* \* \*